United States Patent
Park et al.

(10) Patent No.: US 7,792,429 B2
(45) Date of Patent: Sep. 7, 2010

(54) HYBRID OPTICAL TRANSCEIVER MODULE AND PASSIVE OPTICAL NETWORK INCLUDING THE SAME

(75) Inventors: Sung Woong Park, Gyeonggi-do (KR); Bong Kyu Kim, Daejeon (KR); Bin Yeong Yoon, Daejeon (KR); Dong Soo Lee, Gwangju (KR); Jong Deog Kim, Gwangju (KR); Mun Seob Lee, Gwangju (KR)

(73) Assignee: Electronics and Telecommunications Research Institute, Dae-Jeon (KR)

( * ) Notice: Subject to any disclaimer, the term of this patent is extended or adjusted under 35 U.S.C. 154(b) by 508 days.

(21) Appl. No.: 11/843,492

(22) Filed: Aug. 22, 2007

(65) Prior Publication Data
US 2008/0063402 A1    Mar. 13, 2008

(30) Foreign Application Priority Data
Sep. 12, 2006 (KR) ............. 10-2006-0088122

(51) Int. Cl.
*H04B 10/00* (2006.01)
(52) U.S. Cl. ............. 398/135; 398/72; 398/168
(58) Field of Classification Search ............ 398/72, 398/135, 115–117, 168
See application file for complete search history.

(56) References Cited

U.S. PATENT DOCUMENTS

| | | | |
|---|---|---|---|
| 6,313,938 B1 | 11/2001 | Shikii et al. | |
| 7,327,771 B2 * | 2/2008 | Kim et al. | 372/64 |
| 7,366,380 B1 * | 4/2008 | Peterson et al. | 385/47 |
| 2003/0180012 A1 * | 9/2003 | Deane et al. | 385/92 |
| 2004/0067006 A1 * | 4/2004 | Welch et al. | 385/14 |
| 2005/0226570 A1 * | 10/2005 | Togami et al. | 385/92 |
| 2007/0133990 A1 * | 6/2007 | Kim et al. | 398/72 |
| 2008/0008473 A1 * | 1/2008 | Kim et al. | 398/68 |
| 2009/0214170 A1 * | 8/2009 | Wei et al. | 385/129 |
| 2009/0269066 A1 * | 10/2009 | Lee et al. | 398/79 |

FOREIGN PATENT DOCUMENTS

| | | |
|---|---|---|
| KR | 1020030090431 | 11/2003 |
| KR | 1020050005994 | 1/2005 |
| KR | 1020050120067 | 12/2005 |

OTHER PUBLICATIONS

Mino et al.; "A 10 Gb/s Hybrid-Integrated Receiver Array Module Using a Planar Lightwave Circuit (PLC) Platform Including a Novel Assembly Region Structure"; Journal of Lightwave Technology; Nov. 1996; pp. 2475-2482.
Issue notification for Koraean patent application 10-2006-122.

\* cited by examiner

*Primary Examiner*—Leslie Pascal
(74) *Attorney, Agent, or Firm*—Lowe Hauptman Ham & Berner LLP

(57) ABSTRACT

Provided are a hybrid optical transceiver module having an optical amplifier packaged thereto for outputting a high-power optical signal to remove problems regarding narrow emission angle and optical alignment, and a passive optical network (PON) system having an improved optical network terminal (ONT) accommodation capability using the hybrid optical transceiver module. The hybrid optical transceiver module includes a first package in which an LD (laser diode) is packaged, and a second package in which SOA (semiconductor optical amplifier) and a PD (photo diode) are packaged. The first and second packages are coupled to be one package so as to output a high-power optical signal.

18 Claims, 3 Drawing Sheets

HYBRID OPTICAL TRANSCEIVER MODULE AND PASSIVE OPTICAL NETWORK INCLUDING THE SAME

CROSS-REFERENCE TO RELATED PATENT APPLICATION

This application claims the benefit of Korean Patent Application No. 10-2006-0088122, filed on Sep. 12, 2006, in the Korean Intellectual Property Office, the disclosure of which is incorporated herein in its entirety by reference.

BACKGROUND OF THE INVENTION

1. Field of the Invention

The present invention relates to optical communication, and more particularly, to a high-power hybrid optical transceiver module and a passive optical network (PON) system including the high-power hybrid optical transceiver module and having an improved optical network terminator (ONT) accommodation capability.

2. Description of the Related Art

Fiber To The Home (FTTH) technology is being actively studied and developed all over the world to connect a home to a telephone office using an optical fiber transmission line so as to provide integrated services including voice calls, data services, and broadcasts. The use of FTTH technology will be dramatically increased in the next several years. Particularly, a PON system is the most common FTTH system.

The main consideration in developing FTTH technology is to provide a cost-effective and highly-productive method of transmitting an optical signal in a subscriber line network. Although an wavelength division multiplexing (WDM)-FTTH system (e.g., WDM-PON system) can provide independent and high-capacity communication services for subscribers, the number and interval of wavelength bands available for the WDM-PON system is limited. Therefore, a limited number of subscribers can use the WDM-PON system.

Such disadvantages of the WDM-PON system can be reduced by applying a time division multiplexing access TDMA scheme to the WDM-PON system, and thus the WDM-PON system adapting the TDMA scheme is used as a standard communication method for PON systems. In a TDMA-PON system, a plurality of subscribers shares the same optical wavelength (band) for data transmission. Costs required for constructing a subscriber line network using a PON system are determined by the number of optical network terminals (ONTs) that can be connected to a single optical line terminal (OLT).

Generally, the number of ONTs that can be connected to an OLT is determined by the optical power output of the OLT, optical power losses resulted from optical splitting at a time division multiplexing (TDM) optical splitter, and the power budget for other optical links. For example, when a PON system having sixteen subscriber nodes (sixteen ONTs) requires an optical power level of 0 dBm for normal optical communication, a PON system having two ONTs requires a relatively low optical power level of −6 dBM, and a PON system having one hundred twenty eight ONTs requires a high optical power level of +10 dBm for normal optical communication. That is, a high optical output power level is required to connect many ONTs (e.g., 128 or more ONTs) to one OLT due to optical power losses.

Since there is a limit to increasing the optical output power of an optical transceiver in a PON system, PON systems having an OLT coupled with 16 to 32 ONTs are currently the most common. That is, conventional optical transceiver modules for OLTs have a low optical output power level of about +2 dBm.

The optical output power of an optical transceiver module can be increased by directly increasing the optical output power of a light source such as a laser diode (LD) of the optical transceiver or amplifying the optical output power of the LD using a optical amplifier.

However, both the methods have limits since the optical output power of the LD cannot be increased beyond a certain level, and the additional optical amplifier increases the cost and size of the optical transceiver module.

FIG. 1 illustrates a conventional high-power optical transceiver module.

Referring to FIG. 1, the conventional high-power optical transceiver module includes an optical signal generator 10 generating an optical signal having a predetermined wavelength and an optical amplifier 20 amplifying the optical signal generated from the optical signal generator 10. The optical signal generator 10 includes an LD converting an electric signal into an optical signal and a monitor photo diode (MPD) monitoring the optical signal of the LD.

The optical signal generated from the optical signal generator 10 is transmitted to the optical amplifier 20 through an optical cable 30. The optical amplifier 20 amplifies the optical signal transmitted from the optical signal generator 10 using a semiconductor optical amplifier (SOA).

The high-power optical transceiver module further includes optical connectors 12, 22, and 24. The optical connector 12 connects the optical signal generator 10 and the optical cable 30, and the optical connector 22 connects the cable 30 and the optical amplifier 20. The optical connector 24 connects the optical amplifier 20 to an ONT.

Since the optical signal generator 10 and the optical amplifier 20 are individually packaged in the high-power optical transceiver module, the manufacturing costs and size of the optical transceiver module increase.

FIG. 2 illustrates a conventional high-power optical transceiver module having a planar lightwave circuit (PLC) structure.

Referring to FIG. 2, the high-power optical transceiver module includes an LD 50, an SOA 60, a photo diode (PD) 70, and an optical coupler such as a wavelength division multiplex (WDM) coupler 80 that are integrated on a PLC platform as one package.

Meanwhile, the high-power optical transceiver module further includes an MPD 40 and an optical connector 95. A thermoelectric cooler 90 surrounds the high-power optical transceiver module to stabilize the optical wavelength and power of the optical transceiver module. An optical waveguide 30 is used to connect the components of the optical transceiver module. The optical waveguide 30 includes a first optical waveguide portion 32 located at a transmitting side for transmitting a wavelength signal, a second optical waveguide portion 34 located at a receiving side for receiving a wavelength signal, and a third optical waveguide portion 36 to which the first and second optical waveguide portions 32 and 34 are connected. Both transmitting and receiving wavelength signals are delivered through the third optical waveguide portion 36.

Although the optical transceiver module having the PLC structure is small and cost-effective, it is difficult to precisely arrange the components of the optical transceiver module since the LD 50 and the SOA 60 are formed together on the PLC platform and thus the optical output angles of the LD 50 and SOA 60 are narrow.

SUMMARY OF THE INVENTION

The present invention provides a hybrid optical transceiver module having an optical amplifier packaged thereto for outputting a high-power optical signal to remove problems regarding narrow emission angle and optical alignment.

The present invention also provides a passive optical network (PON) system having an improved optical network terminal (ONT) accommodation capability using a hybrid optical transceiver module.

According to an aspect of the present invention, there is provided a hybrid optical transceiver module including: a first package in which an LD (laser diode) is packaged; and a second package in which SOA (semiconductor optical amplifier) and a PD (photo diode) are packaged, wherein the first and second packages are coupled to be one package so as to output a high-power optical signal.

The first package may be formed into a transmitter optical sub-assembly (TOSA) structure. The LD may include a cooling mechanism or is formed into a TO-CAN package structure without a cooling mechanism, and the TOSA structure may include a thermoelectric element that is packaged into the LD having the cooling mechanism or is connected to the LD having the TO-CAN package structure via an addition device in the form of a package.

The SOA and PD of the second package may be packaged into a PLC (planar lightwave circuit) platform structure, and the second package may include a WDM (wavelength division multiplex) coupler. The PD may be an APD (avalanche PD) or a PIN PD.

The first and second packages may be coupled to each other by using the active optical alignment method to determine an optimal position at which optical alignment losses occur minimally and coupling the first and second packages at the optimal position using laser welding. The first and second packages may be coupled to each other by the active optical alignment method using laser welding so as to minimize optical alignment losses. The hybrid optical transceiver module forming by coupling the first and second packages may be used in an OLT (optical line terminal) of a PON (passive optical network) system.

The PON system may include a splitter transmitting/receiving signals to/from ONTs (optical network terminals) using a predetermined communication scheme. The predetermined communication scheme may be a TDMA (time division multiplexing access) scheme. The hybrid optical transceiver module may have an output power of 10 dBm or larger so as to allow the PON system to accommodate 128 or more ONTs.

According to another aspect of the present invention, there is provided a PON system including: an OLT including the hybrid optical transceiver module of claim 1; one or more ONTs; and an RN (remote node) relaying signals between the OLT and the ONT, wherein the hybrid optical transceiver outputs a high-power optical signal so as to improve an ONT accommodation capability of the PON system.

The first package may be a TOSA structure package and the second package may be a PLC structure package, and the first and second packages may be coupled to each other by using an active optical alignment method to determine an optimal position at which optical alignment losses occur minimally and coupling the first and second packages at the optimal position using laser welding.

The PLC structure may include a WDM coupler. The RN may include a splitter transmitting/receiving signals to/from the ONTs using a predetermined communication scheme. The predetermined communication scheme may be a TDMA scheme.

According to the present invention, the LD generating an optical signal is packaged in a region of the hybrid optical transceiver module. The SOA amplifying an optical signal, the PD converting an optical signal into an electric signal, and/or the WDM coupler distributing an optical wavelength input and an optical wavelength output are packaged into another region (PLC platform) of the hybrid optical transceiver module. Therefore, the hybrid optical transceiver module can output a high-power optical signal, and thus problems regarding narrow emission angle and optical alignment can be removed. As a result, a cost-effective PON system having an improved ONT accommodation capability can be provided using the hybrid optical transceiver module. For example, when the hybrid optical transceiver module has an output power of 10 dBm or larger, the PON system can accommodate 128 or more ONTs.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
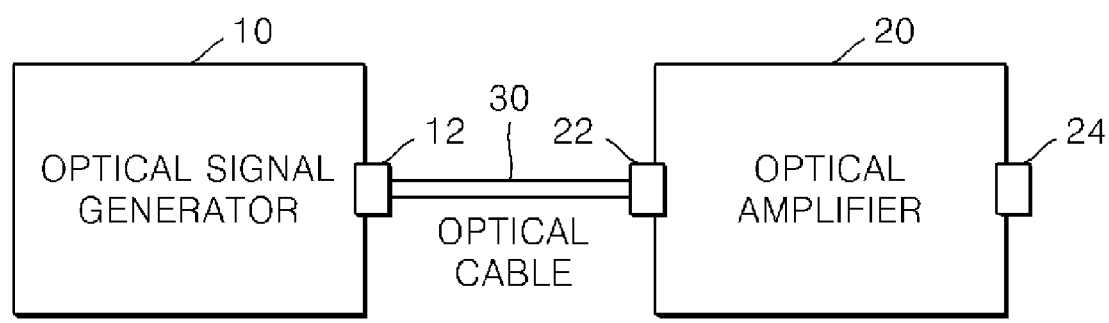
FIG. 1 illustrates a conventional high-power optical transceiver module.
Figure 2:
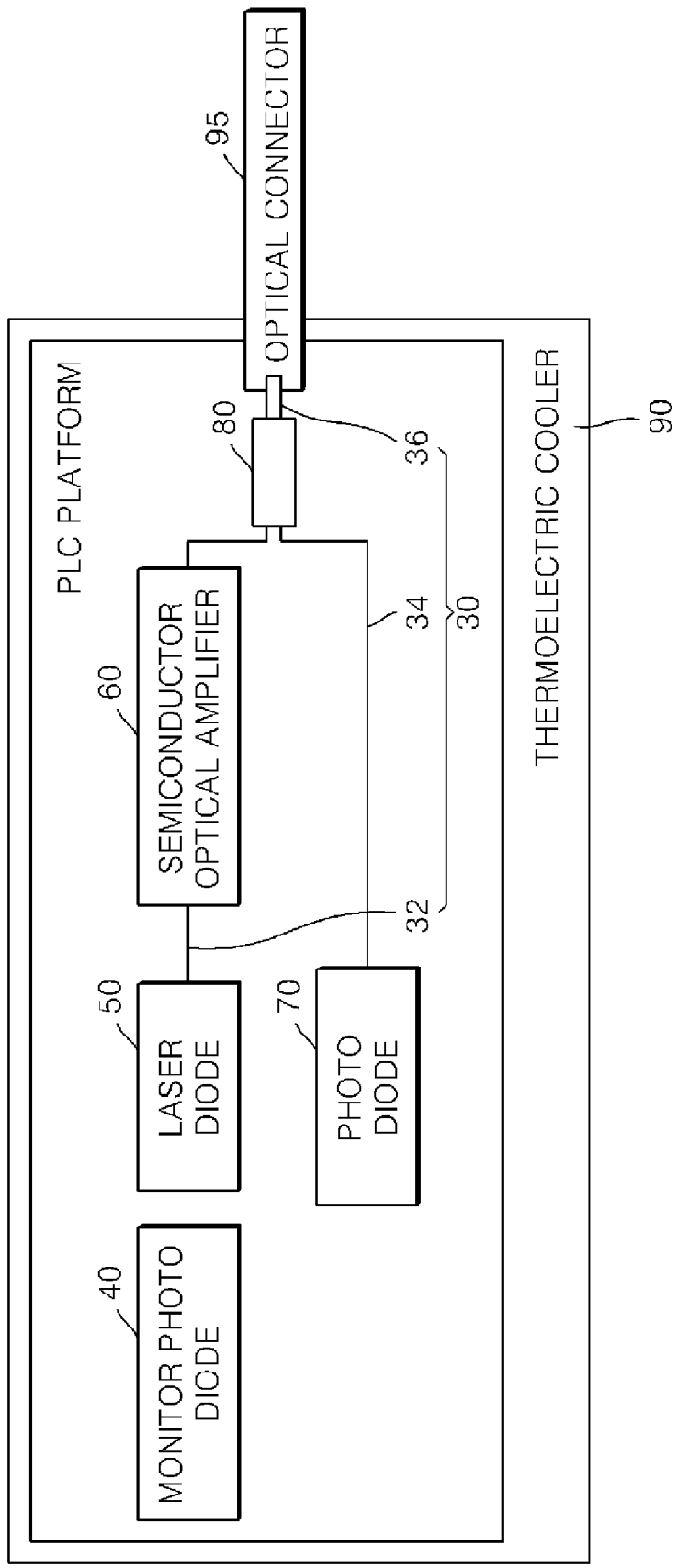
FIG. 2 illustrates a conventional high-power optical transceiver module having a planar lightwave circuit (PLC) structure.

The present invention will now be described more fully with reference to the accompanying drawings, in which exemplary embodiments of the invention are shown. In the drawings, the thicknesses of layers and regions are exaggerated for clarity, and like reference numerals in the drawings denote like elements, and thus their description will be omitted. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 3:
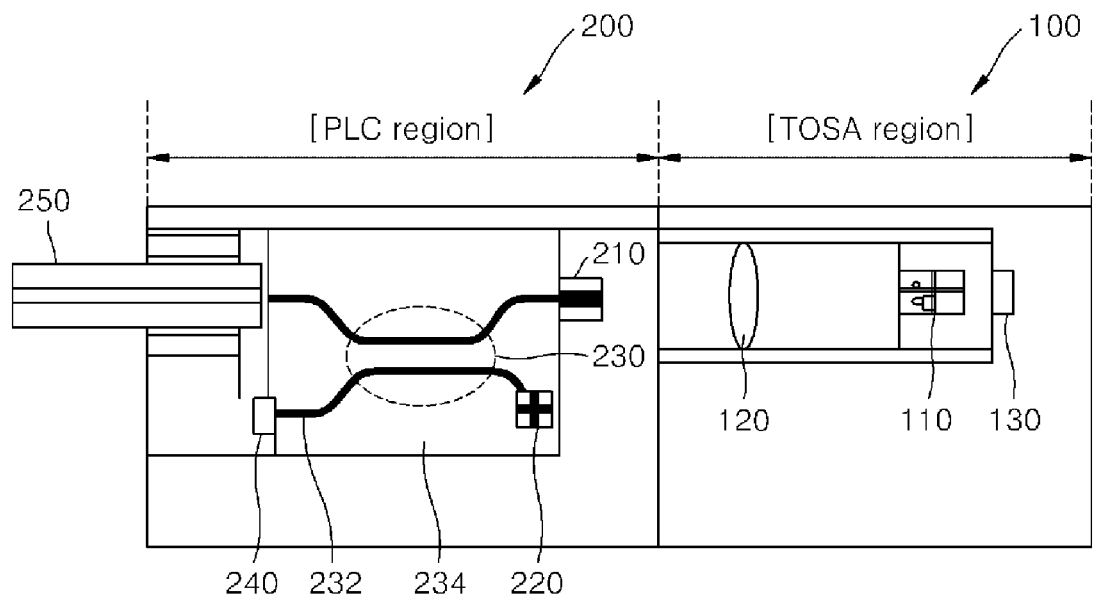
FIG. 3 illustrates a hybrid optical transceiver module according to an embodiment of the present invention.

FIG. 3 illustrates a hybrid optical transceiver module according to an embodiment of the present invention.

Referring to FIG. 3, the hybrid optical transceiver module is formed into a hybrid package structure having two packages coupled to each other. In detail, the hybrid optical transceiver module includes a first package 100 having a transmitter optical sub-assembly (TOSA) structure and a second package 200 having a planar lighwave circuit (PLC) structure. The first package 100 includes a laser diode (LD) 110 generating an optical signal, a lens 120 condensing light emitted from the LD 110, and a monitor photo diode (MPD) 130. The second package 200 includes a semiconductor optical amplifier (SOA) 210, a photo diode (PD) 220 converting an optical signal into an electric signal, and a wavelength division multiplex (WDM) coupler 230 distributing an optical wavelength input and an optical wavelength output, and MPD 240. The first and second packages 100 and 200 are coupled by optical aligning so as to form the hybrid optical transceiver module.

In more detail, the first package 100 is packaged into a TOSA structure. The LD includes a cooling mechanism or is formed into a TO-CAN package structure without a cooling mechanism, and the TOSA structure may include a conventional thermoelectric element that is packaged into the LD having the cooling mechanism or is connected to the LD having the TO-CAN package structure via an addition device in the form of a package. The LD 110 may be a direct modulated laser or an external modulated laser (EML). For example, the LD 110 may be a 10-G EML. The MPD 130 monitors the optical output power of the LD 110. The lens 120 condenses light emitted from the LD 110 onto an optical waveguide of the SOA 210.

The second package 200 is packaged into a PLC platform structure. A thermoelectric cooler can be installed to a PLC platform so as to remove heat-dissipating problems of the hybrid optical transceiver module. The WDM coupler 230 is formed of two optical waveguide 232 that are optically coupled. The WDM coupler 230 is formed in a silicon oxide ($SiO_2$) layer 234. Usually, the PD 220 may be an avalanche PD (APD). However, the PD 220 may be a PIN PD. Meanwhile, the MPD 240 monitors an optical signal amplified by the SOA 210 or a receiving optical signal. The second package 200 is connected to an external optical fiber 250 and transmits an amplified optical signal to the outside of the hybrid optical transceiver module.

The first and second packages 100 and 200 are coupled by laser welding using an active optical alignment method. In detail, light emitted from the LD 110 is condensed onto the waveguide of the SOA 210 using the lens 120, and the light condensing is examined using the active optical alignment method to determine an optimal position at which optical alignment losses occur minimally. Then, the first and second packages are coupled by laser welding using the determined optimal position.

In the hybrid optical transceiver module of the current embodiment, components are integrated into a hybrid package. Therefore, the optical output power of the hybrid optical transceiver module can be increased without increasing the size and cost of the hybrid optical transceiver module. That is, problems of a conventional optical transceiver module related to the size and price thereof can be removed. Accordingly, more optical network terminals (ONTs) can be connected to a PON system using the hybrid optical transceiver module.

Figure 4:
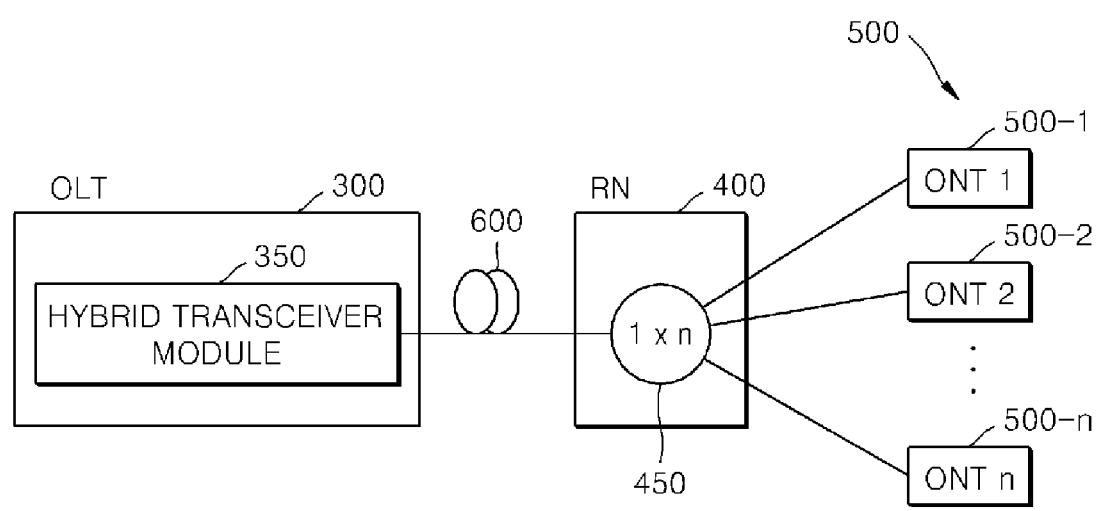
FIG. 4 illustrates a passive optical network (PON) system including a hybrid optical transceiver module according to an embodiment of the present invention.

FIG. 4 illustrates a PON system including a hybrid optical transceiver module according to an embodiment of the present invention.

Referring to FIG. 4, the PON system includes an optical line terminal (OLT) 300, a remote node (RN) 400, and a plurality of ONTs 500 (500-1 through 500-*n*). The OLT 300 and the RN 400 are connected through an optical cable 600.

In the current embodiment, the OLT 300 of the PON system includes a hybrid optical transceiver module 350 having the same configuration as the hybrid optical transceiver module of FIG. 3. Thus, the optical output power of the OLT 300 can be high. The RN 400 includes a time division multiplexing access (TDMA) splitter 450 so as to supply a predetermined wavelength optical signal from the OLT 300 to the plurality of ONTs 500-1 through 500-*n* using a TDMA scheme.

In detail, the splitter 450 receives an optical signal having a predetermined wavelength and makes optical signals having the same wavelength as the received optical signal by splitting the received optical signal so as to sends the optical signals to the plurality of ONTs 500-1 through 500-*n*. Although the split optical signals have the same wavelength as the original signal, the optical power of the split optical signals decreases with the number of split optical signals. The optical loss at splitter increases in reverse proportion to the number of ONTs 500. Thus, optical power should be compensated for in proportion to an increased number of ONTs 500. In a conventional PON system, an amplifier is coupled to an LD to compensate for such optical power loss. However, as described above, there is a limit to increasing the number of ONTs that use the same wavelength by adding an amplifier since the manufacturing costs and the size of the optical transceiver module are increased due to the amplifier.

In the current embodiment, however, such a limitation is obviated by using the hybrid optical transceiver module 350 in the PON system. Therefore, the number of the ONTs 500-1 through 500-*n* connected to the single OLT 300 using the same wavelength optical signal can be largely increased. For example, 128 or more ONTs 500 can communicate with the OLT 300 when the output power of the hybrid optical transceiver module 350 is 10 dBm or larger.

Meanwhile, in the current embodiment, the PON system may include a plurality of OLTs 300 using a WDM scheme although one OLT 300 is illustrated in FIG. 4. Therefore, as the number of ONTs 500 connected to each OLT 300 increases, the number of ONTs 500 connected to the whole PON system may dramatically increase.

As described above, according to the present invention, the hybrid optical transceiver module is formed into a hybrid package structure in which two packages are coupled to each other as one hybrid package (i.e., a TOSA package (region) having an LD and a PLC package (region) having an SOA, PD, and a WDM coupler are coupled to each other as one hybrid package). Therefore, problems of a conventional optical transceiver involving size and cost problems can be obviated in the hybrid optical transceiver module of the present invention. Furthermore, difficulties in optical alignment due to narrow light emitting angle can be removed.

Moreover, in the PON system of the present invention, the optical output power of the OLTs is increased by using the hybrid optical transceiver modules. Therefore, a number of ONTs (e.g., 128 or more ONTs) can be connected to each OLT, and thus the total number of ONTs connected to the PON system can be dramatically increased. Furthermore, since the hybrid optical transceiver module is not expensive, the whole PON system can be cost effectively constructed.

The invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves such as data transmission through the Internet. The computer-readable recording medium can also be distributed over network-coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A hybrid optical transceiver module comprising:
a first package in which an LD (laser diode) is packaged; and
a second package in which a SOA (semiconductor optical amplifier) and a PD (photo diode) are packaged;
wherein the first and second packages are coupled to be one package so as to output a high-power optical signal, and the first and second package are coupled to each other by active optical alignment.

2. The hybrid optical transceiver module of claim 1, wherein the first package is formed into a transmitter optical sub-assembly (TOSA) structure.

3. The hybrid optical transceiver module of claim 2, wherein the LD comprises a cooling mechanism or is formed into a TO-CAN package structure without a cooling mechanism, and the TOSA structure comprises a thermoelectric element that is packaged into the LD having the cooling mechanism or is connected to the LD having the TO-CAN package structure.

4. The hybrid optical transceiver module of claim 2, wherein the LD is an EML (external modulated laser), and the TOSA structure comprises a lens condensing light emitted from the LD onto a light waveguide of the SOA, and an MPD (monitor photo diode) monitoring an optical output of the LD.

5. The hybrid optical transceiver module of claim 1, wherein the SOA and PD of the second package are packaged into a PLC (planar lightwave circuit) platform structure.

6. The hybrid optical transceiver module of claim 5, wherein the PLC platform structure comprises a WDM (wavelength division multiplex) coupler.

7. The hybrid optical transceiver module of claim 6, wherein the PLC platform structure comprises an MPD connected to the WDM coupler for monitoring an optical power of a received signal, and a thermoelectric cooler for dissipating heat.

8. The hybrid optical transceiver module of claim 1, wherein the first package is a TOSA structure package and the second package is a PLC structure package.

9. The hybrid optical transceiver module of claim 1, wherein the first and second packages are laser welded.

10. The hybrid optical transceiver module of claim 1, wherein the hybrid optical transceiver module is used in an OLT (optical line terminal) of a PON (passive optical network)-system.

11. The hybrid optical transceiver module of claim 10, wherein the PON system comprises a splitter for transmitting/receiving signals to/from ONTs (optical network terminals) using a TDMA (time division multiplexing access) scheme.

12. A PON (passive optical network) system comprising:
an optical line terminator (OLT) including the hybrid optical transceiver module of claim 1;
one or more optical network terminal (ONT); and
an RN (remote node) relaying signals between the OLT and the one or more ONT,
wherein the hybrid optical transceiver is configured to output a high-power optical signal so as to improve an ONT accommodation capability of the PON-system.

13. The PON system of claim 12, wherein the first package is formed into a TOSA (transmitter optical sub-assembly) structure.

14. The PON system of claim 12, wherein the SOA and PD of the second package of the hybrid optical transceiver module are packaged into a PLC (planar lightwave circuit) platform structure.

15. The PON system of claim 14, wherein the PLC platform structure comprises a WDM (wavelength division multiplex) coupler.

16. The PON system of claim 12, wherein the first package is a TOSA (transmitter optical sub-assembly) structure package and the second package is a PLC (planar lightwave circuit) structure package, and
the first and second packages are laser welded together.

17. The PON system of claim 12, wherein the RN comprises a splitter for transmitting/receiving signals to/from the ONTs using a TDMA scheme.

18. A PON (passive optical network) system comprising:
an optical line terminator (OLT), further comprising a hybrid optical transceiver that includes:
a first package having a LD (laser diode); and
a second package laser welded to the first package, the second package having a SOA (semiconductor optical amplifier), a WDM (wavelength division multiplex) coupler, and a PD (photo diode);
wherein the first and second packages are in active optical alignment with each other;
one or more optical network terminals (ONTs); and
an RN (remote node) relaying signals between the OLT and the ONT;
wherein the hybrid optical transceiver includes outputs configured to output a high-power optical signal that improve an ONT accommodation capability of the PON system.

* * * * *